July 23, 1963 L. D. O'DONNELL 3,098,466
CATTLE SCRATCHER AND OILER
Filed May 29, 1961
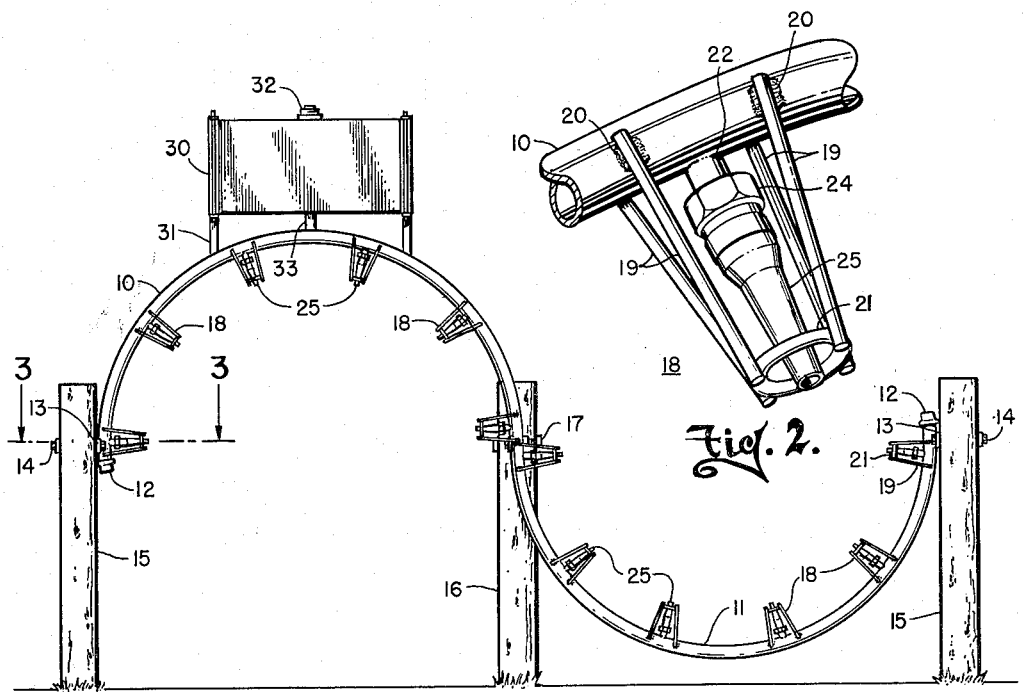
Fig. 1.
Fig. 2.
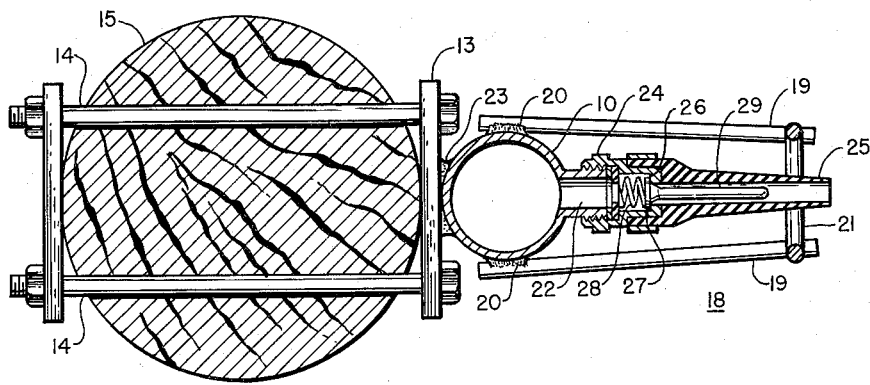
Fig. 3.
INVENTOR.
LESLIE D. O'DONNELL
BY
ATTORNEY.

United States Patent Office 3,098,466
Patented July 23, 1963

3,098,466
CATTLE SCRATCHER AND OILER
Leslie D. O'Donnell, P.O. Box 552, Benkelman, Nebr.
Filed May 29, 1961, Ser. No. 113,161
2 Claims. (Cl. 119—157)

This invention relates to a currying, scratching and rubbing device for cattle and has for its principal object the provision of a highly efficient economical installation which will provide a plurality of efficient scratching members conveniently positioned to be contacted by an animal for rubbing, currying, and scratching purposes and to so construct the device that the scratching members will be positioned at both sides of and above and below the body of the animal so that the animal can quickly and easily locate a scratching member convenient to reach any desired area of his hide.

Another object of the invention is to provide a currying or scratching installation as above described with means to automatically and simultaneously feed any desired insecticide oils or solutions to the body areas being scratched and which will be operable by body contact.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a front elevational view of the improved cattle scratcher and oiler;

FIG. 2 is a fragmentary enlarged perspective view illustrating a scratching element and oil applying nozzle as employed in this invention; and FIG. 3 is an enlarged, cross-section taken on the lines 3—3, FIG. 1, illustrating the internal construction of the oil-applying nozzle.

The invention employs a continuous S-shaped pipe having an upwardly curved pipe portion 10 and a downwardly curved pipe portion 11 forming a reversely curved unitary conduit lying in a vertical plane. The extremities of the pipe are closed by means of suitable caps 12 and attachment pads 13 are welded to the pipe, as indicated at 23, adjacent each of its extremities. The attachment pads 13 are bolted, by means of suitable attachment bolts 14, to terminal supporting posts 15 imbedded in the ground. The mid-portion of the pipe is preferably supported and braced by an intermediate post 16 to which the pipe is secured in any desired manner such as by means of a post clamping bracket 17.

A plurality of scratching elements, designated in their entirety by the numeral 18, project from the pipe 10 at substantially uniformly-spaced intervals. The scratching elements on the upwardly curved pipe portion 10 project radially downward and inward and the scratching elements on the downwardly curved pipe portion 11 project radially upward and inward.

The scratching elements comprise four relatively straight stiff rods 19, two of the rods being welded, as shown at 20, to each side of the pipe. The outer extremities of the rods 19 are welded at uniformly spaced intervals about the periphery of a circular spacing ring 21. The extremities of the rods may project slightly beyond the spacing ring 21 to provide scratching protuberances.

A discharge nipple 22 projects from and communicates with the pipe on the axis of each scratching member 18. A valve housing 24 is threaded onto each nipple 22 and a flexible, tubular nozzle 25 is mounted on and projects axially from the valve housing 24. The valve housing contains a valve seat 26 against which a tilt valve 27 is constantly and flexibly urged by means of a suitable valve spring 28. A valve stem 29 projects from tilt valve 26 into the interior of the flexible nozzle 25.

Thus, it can be seen that when the nozzle 25 is flexed to one side, the valve 27 will be tilted from its seat 26 in consequence of the swinging action of the valve stem 29. The relative lengths of the rods 19 and the nozzle 25 are such that the extremity of the nozzle projects slightly beyond the spacing ring 21, as shown in FIG. 3.

An oil tank 30 is mounted at the high point of the upwardly curved pipe portion 10 on suitable supporting brackets 31. The oil tank 30 is provided with a convention filling neck 32 and is connected to the pipe portion 10 by means of a gravity discharge conduit 33. The tank 30 and the pipe portions 10 and 11 are constantly maintained filled with a desirable insecticide oil or solution.

In use, an animal walks beneath the upwardly curved pipe portion 10 and scratches his neck, sides and back against the scratching elements 18. He can also step over the downwardly curved pipe portion 11 for scratching the lower portions of his body. Smaller animals which cannot reach the elements of the upwardly turned pipe portion 10 can make use of the elements in the downwardly turned portion.

As the animal contacts each element, the nozzle 25 therein will be flexed back and forth intermittently opening the tilt valve therein to allow treating oil to flow from the tank 30 to the animal.

While a specific form of the improvement has been described and illustrated herein, it is to be understood that the same may be varied within the scope of the appended claims, without departing from the spirit of the invention.

Having thus described the invention what is claimed and desired to be secured by Letters Patent is:

1. A cattle scratching and oiling device comprising: a reversally curved pipe having an upper curved portion and a lower curved portion; means supporting said pipe in a vertical plane with the two portions horizontally opposed; a solution tank mounted on and above said pipe; a conduit feeding solution from said tank to said pipe; a plurality of spaced-apart scratching members mounted on said pipe and lying in the plane of the latter, the scratching members on the upper curved portion extending radially downward and inward and the scratching members on the lower curved portion extending radially upward and inward, said scratching members including a group of relatively stiff rods secured to said pipe at their one extremity, and extending radially inward of said arched pipe; a circular spacing-ring, the radially inward extremities of said rods being secured to and acting to support said spacing ring; a discharge nipple communicating with said pipe in alignment with the axis of said ring; a valve housing mounted on said nipple; a flexible tubular nozzle mounted on said housing and projecting axially through said ring; a valve seat in said housing; a valve normally closing said seat; and a valve stem projecting from said valve into the interior of said flexible nozzle so that when said nozzle is flexed by an animal rubbing against said ring, said valve will be opened to allow fluid to escape from said pipe through said nozzle.

2. A cattle scratching and oiling element as described in claim 1 in which the inward extremities of said rod project beyond said ring to contact and scratch the animal engaging said nozzle.

References Cited in the file of this patent
UNITED STATES PATENTS

| | | |
|---|---|---|
| 1,138,553 | Goeden | May 4, 1915 |
| 2,456,197 | Jensen | Dec. 14, 1948 |
| 2,988,050 | Minock | June 13, 1961 |